(12) United States Patent
Light-Holets

(10) Patent No.: US 11,280,283 B2
(45) Date of Patent: Mar. 22, 2022

(54) ENGINE CONTROL SYSTEM AND METHOD BASED ON FUEL QUALITY

(71) Applicant: CUMMINS INTELLECTUAL PROPERTY, INC., Minneapolis, MN (US)

(72) Inventor: Jennifer K. Light-Holets, Greenwood, IN (US)

(73) Assignee: CUMMINS INTELLECTUAL PROPERTY, INC., Minneapolis, MN (US)

( * ) Notice: Subject to any disclaimer, the term of this patent is extended or adjusted under 35 U.S.C. 154(b) by 0 days.

(21) Appl. No.: 15/949,969

(22) Filed: Apr. 10, 2018

(65) Prior Publication Data

US 2018/0238246 A1 Aug. 23, 2018

Related U.S. Application Data

(63) Continuation of application No. 15/005,385, filed on Jan. 25, 2016, now Pat. No. 9,938,915, which is a
(Continued)

(51) Int. Cl.
*F02D 41/14* (2006.01)
*F02D 41/00* (2006.01)
(Continued)

(52) U.S. Cl.
CPC ............ *F02D 41/005* (2013.01); *F01N 11/00* (2013.01); *F02D 13/0215* (2013.01);
(Continued)

(58) Field of Classification Search
CPC ......... F02D 41/1444; F02D 2200/0611; F02D 2200/0612; F01N 11/007
See application file for complete search history.

(56) References Cited

U.S. PATENT DOCUMENTS 6,112,151 A 8/2000 Kruse
6,199,372 B1 3/2001 Wakamoto
(Continued)

FOREIGN PATENT DOCUMENTS

CN 101184913 5/2008
CN 101360904 A 2/2009
(Continued)

OTHER PUBLICATIONS

International Preliminary Report on Patentability for PCT Application No. PCT/US2011/053056 dated Mar. 26, 2013, 6 pgs.
(Continued)

*Primary Examiner* — Erick R Solis
(74) *Attorney, Agent, or Firm* — Faegre, Drinker, Biddle & Reath, LLP

(57) ABSTRACT

An engine control system and method includes sensing the quality of fuel in the engine relative to emissions, by for example sensing the level of an emission related constituent, such as sulfur. A fuel quality sensor detects a fuel quality of a fuel, such as the sulfur level the fuel, and provides a signal in response to the fuel quality. The engine control system also includes a navigation device to determine whether an engine is located in a regulated or non-regulated region. The engine control system receives the signal and controls engine operation by, for example, enabling or disabling one or more engine algorithms to improve performance of the engine based on the fuel quality signal or, in other embodiments, the combination of the fuel quality and the location of the engine.

15 Claims, 5 Drawing Sheets

Related U.S. Application Data continuation of application No. 14/164,740, filed on Jan. 27, 2014, now Pat. No. 9,243,581, which is a continuation of application No. 13/243,536, filed on Sep. 23, 2011, now abandoned.

(60) Provisional application No. 61/386,334, filed on Sep. 24, 2010.

(51) Int. Cl.
  *F02D 43/04* (2006.01)
  *F01N 11/00* (2006.01)
  *F02D 13/02* (2006.01)
  *F02P 5/15* (2006.01)
  *G01S 19/13* (2010.01)

(52) U.S. Cl.
  CPC ......... *F02D 41/0025* (2013.01); *F02D 43/04* (2013.01); *F02P 5/15* (2013.01); *G01S 19/13* (2013.01); *F01N 11/007* (2013.01); *F02D 41/1444* (2013.01); *F02D 2200/0611* (2013.01); *F02D 2200/701* (2013.01)

(56) References Cited

U.S. PATENT DOCUMENTS

| | | | |
|---|---|---|---|
| 6,301,882 B1 | 10/2001 | Manaka | |
| 6,370,472 B1 | 4/2002 | Fosseen | |
| 6,823,667 B2 | 11/2004 | Braun et al. | |
| 7,062,371 B2 | 6/2006 | Gault et al. | |
| 7,522,994 B2 | 4/2009 | Durand | |
| 7,630,823 B2 | 12/2009 | Gallagher et al. | |
| 7,841,317 B2 | 11/2010 | Williams et al. | |
| 9,243,581 B2 | 1/2016 | Light-Holets | |
| 9,938,915 B2 | 4/2018 | Light-Holets | |
| 2002/0152741 A1 | 10/2002 | Bidner et al. | |
| 2003/0182026 A1* | 9/2003 | Awada | B60K 31/0058 |
| | | | 701/1 |
| 2005/0072384 A1 | 4/2005 | Hadley et al. | |
| 2006/0266018 A1 | 11/2006 | Durand | |
| 2007/0143007 A1* | 6/2007 | Durand | F02D 41/0025 |
| | | | 701/32.3 |
| 2008/0178576 A1 | 7/2008 | Meier et al. | |
| 2008/0243354 A1 | 10/2008 | Grichnik et al. | |
| 2009/0171549 A1 | 7/2009 | Hyde et al. | |
| 2010/0280734 A1 | 11/2010 | Brinton et al. | |
| 2011/0041478 A1 | 2/2011 | Lee et al. | |
| 2011/0056185 A1 | 3/2011 | Bradley et al. | |
| 2011/0083641 A1 | 4/2011 | Gokhale et al. | |
| 2011/0138781 A1 | 6/2011 | Richter et al. | |
| 2012/0055143 A1 | 3/2012 | Asanuma et al. | |
| 2012/0078487 A1* | 3/2012 | Light-Holets | F02D 41/0025 |
| | | | 701/102 |
| 2015/0371460 A1 | 12/2015 | Wenzel et al. | |

FOREIGN PATENT DOCUMENTS

| | | |
|---|---|---|
| CN | 101802375 A | 8/2010 |
| DE | 212006000080 | 12/2008 |
| DE | 112014001142 T5 | 11/2015 |
| WO | 2007/073437 A1 | 6/2007 |
| WO | 2014/137518 A1 | 9/2014 |

OTHER PUBLICATIONS

International Search Report and Written Opinion for PCT Application No. PCT/US11/53056 dated Feb. 11, 2012, 2 pgs.
First Office Action Report issued by the China National Intellectual Property Administration, dated Jul. 20, 2020, 20 pages.

* cited by examiner

ENGINE CONTROL SYSTEM AND METHOD BASED ON FUEL QUALITY

CROSS-REFERENCE TO RELATED APPLICATIONS

This application is a continuation of application Ser. No. 15/005,385, filed Jan. 25, 2016, now U.S. Pat. No. 9,938,915, issued Apr. 10, 2018, which is a continuation of application Ser. No. 14/164,740, filed Jan. 27, 2014, now U.S. Pat. No. 9,243,581, issued Jan. 26, 2016, which is a continuation of application Ser. No. 13/243,536, filed Sep. 23, 2011, which claims the benefit of U.S. Provisional Application No. 61/386,334, filed Sep. 24, 2010, the disclosures of which are herein incorporated by reference in their entirety.

TECHNICAL FIELD

The present disclosure is directed to an engine, a method, and a system for controlling an engine. More particularly, the present disclosure is directed to controlling an engine based on the quality of the fuel being used by the engine.

BACKGROUND

Them exists a challenge for engines to operate in compliance with, more restrictive emissions standards, such as Tier 4 emissions standards. Emissions standards for engines vary widely around the globe at any given time and also such standards vary over time. For example, an engine, such as in a marine vessel may encounter two or more different emissions standards as the vehicle travels to and from different countries or if the vessel travels or the machinery is sold into a new geographic location having a different emissions standard. In some countries, operators may be penalized for not using the correct diesel fuel based on the enforced diesel fuel emissions standard. In some countries having less restrictive or no emissions standards, operators are permitted to use fuels with a relatively higher impurity level without penalty since some fuel grades, such as ultra low sulfur diesel (ULSD), may not even be available.

SUMMARY OF THE INVENTION

The inventions include an engine control system, comprising a fuel constituent sensor to detect a level of an emissions related constituent of fuel present in an engine and to provide a fuel constituent level signal based on the detected level of the constituent in the fuel present in the engine; and an electronic control device to control operation of the engine based on the fuel constituent level signal. The emissions related constituent may be sulfur and the fuel constituent sensor may detect a level of sulfur in the fuel present in the engine. The electronic control device may be adapted to receive the fuel constituent level signal and to deactivate an engine exhaust gas recirculation system when the fuel constituent level signal is above a predetermined level and/or modify operation of an engine exhaust aftertreatment system when the fuel constituent level signal is above a predetermined level. The aftertreatment system may be a selective catalytic reduction system with diesel exhaust fluid dosing, and the electronic control device may be adapted to disable the selective catalytic reduction system to prevent dosing of diesel exhaust fluid when fuel constituent level signal is above a predetermined level.

The inventions also includes a method for controlling an engine, comprising detecting a level of an emissions related constituent of fuel present in an engine while the fuel is in the engine, and controlling operation of the engine based on the fuel constituent level. The emissions related constituent may be sulfur and the detecting may include detecting a level of sulfur in the fuel present in the engine.

The inventions may also include an engine control system connected to an engine, comprising a fuel quality sensor positioned in the engine to detect a quality of a fuel present in the engine and provide a signal indicative of the fuel quality, a geographic location device to determine a geographic location of the engine and generate a location signal, and an electronic control device in communication with the fuel quality sensor and the geographic location device to receive the fuel quality signal and the geographic location signal, wherein the electronic control device adapted to control operation of the engine based on the fuel quality signal and the geographic location signal. At least one of the geographic location device and the electronic control device may be adapted to determine whether the engine is located in an emissions regulated geographic region based on the geographic location signal. The electronic control device may be adapted to modify operation of the engine upon determining the engine is located in an unregulated region.

The inventions also include a method for controlling an engine, comprising detecting a quality of a fuel present in the engine, providing a signal indicative of the fuel quality, determining whether the engine is located in an emissions regulated region, and controlling operation of the engine based on the feel quality signal and whether the engine is located in an emissions regulated geographic region.

BRIEF DESCRIPTION OF THE FIGURES

The foregoing and other objects, features and advantages of the invention will be apparent from the following more particular description of exemplary embodiments of the invention, as illustrated in the accompanying drawings in which like reference characters refer to the same parts throughout different views. The drawings are not meant to limit the invention to particular mechanisms for carrying out the invention in practice, but rather, the drawings are illustrative of certain ways of performing the invention. Others will be readily apparent to those skilled in the art.

DETAILED DESCRIPTION

Figure 1:
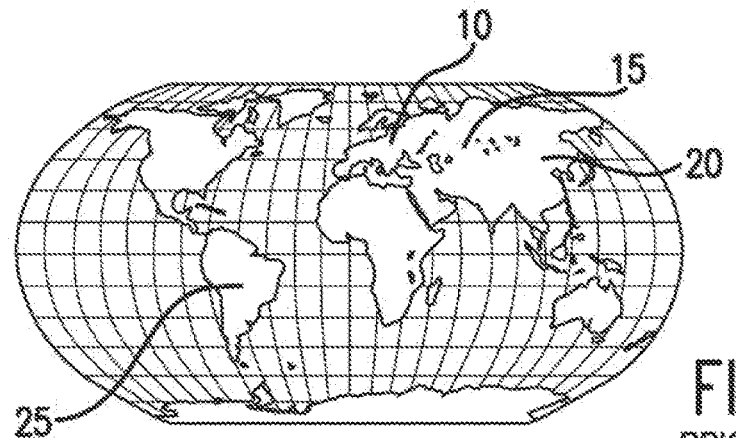
FIG. 1 shows a world map of different diesel fuel emissions standards based on a location of an engine device according to the present disclosure.

There exist multiple geographical jurisdictions having different and varying emissions standards. Turning now to FIG. 1, there is shown a geographical map illustrating different areas or regions potentially having different diesel fuel emissions standards. The map of FIG. 1 is illustrative and forms no limitations to the present disclosure, and the present disclosure is not limited to any particular number of emissions standards. It should be noted that a particular country may even have more than two different standards. For example, in the European Union shown as reference numeral 10, the Euro 4 standard has applied since 2005, which specifies a maximum of 50 parts per million "ppm" of sulfur in diesel fuel for most highway vehicles. In 2005, ultra-low sulfur diesel with a maximum of 10 ppm of sulfur also became available. In 2009, the European Union 10 defined the Euro 5 fuel standard, as diesel fuel with no more than 10 ppm of sulfur. Diesel fuel for most non-highway applications is also expected to conform to the Euro 5 standard.

However, in other locations, for example, Russia as indicated by reference numeral 15, as of 2002, much of the country and surrounding cites still apply limits on sulfur in diesel fuel substantially higher than in European Union 10. Maximum levels of 2,000 and 5,000 ppm of sulfur are applied for different uses, while lower maximum levels of 350 ppm and 500 ppm are enforced in certain areas, particularly Moscow and St. Petersburg. Additionally, since 2002, China, as indicated by reference numeral 20, has limited sulfur in diesel fuel to 2,000 ppm, with limits of 500 ppm applied for certain cities. Brazil 25 requires diesel fuel having a 2,000 ppm rating in rural areas and a 500 ppm rating in metropolitan areas.

Therefore, different geographic areas (even in the same country) often require different emissions standards. But engine devices of different types, including construction equipment, e.g. bulldozers, trucks, and marine vessels, may travel from one jurisdiction to another and back again, or may be sold or leased to one area or another. The engine device may experience multiple different emissions standards for diesel fuel during the life of the engine device. The engine device's life may be over twenty years and must conform, to the emissions standards, at its various locations at the time of time of its manufacture over this interval or risk being penalized for non-compliance.

In some areas, ultra low sulfur diesel fuel is required while in other areas ultra low sulfur diesel fuel is not required by the local emissions standards and therefore, is likely not readily available. Additionally, running these engines on fuel, with different sulfur levels than the engine is designed for, may activate diagnostic devices that indicate that the system is not working correctly. For example, a light on the dashboard may indicate high NOx emissions or the system, may reduce power to the engine. Diagnostic devices will detect elevated levels of emissions and the engines would then compensate and have poor or substandard performance, which may not meet a customer's expectations for operation of the engine. It may be difficult and burdensome for the operator to locate stations where ultra low sulfur diesel fuel is sold. It also may be frustrating for the operator to operate the engine with poor performance or even face fines for not complying with the correct emissions standard.

Applicant's recognized that a fuel quality sensor may be used to detect the quality, that is, the emissions producing quality, of the fuel actually being used in the engine at any given time and control engine operation based on this quality. In accordance with embodiments consistent with the claimed invention, engine operation may be modified, based on a real time-fuel quality signal indicating the quality of the fuel present in, and being used by, the engine to improve engine performance with fuel that has a lower quality, i.e. a higher emissions related constituent, such as sulfur, level, to protect certain engine components and systems from damage by the lower quality fuel, and to control engine operation to entice the operator to use a higher quality fuel. Thus these embodiments sense a fuel quality of the fuel being used in the engine and control or alter engine operation, such as by enabling or disabling control algorithms, based on the determined fuel quality to, for example, protect the engine from damage, without consideration of the engine's geographical location.

Although the above described concept alone is beneficial, engine device operators may be able to tamper with the engine device to, for example, deactivate or adjust the sensor to permit operation of the engine on lower quality fuel. The operator may then simply fuel the engine device with fuel that has a lower than acceptable quality, that is, a higher than acceptable level of an impurity or constituent, such as sulfur, and thus violate the current fuel emissions standard of the geographic location where the engine is operating.

Embodiments described, herein sense a fuel quality of the fuel being used in the engine and also determine whether the engine is in a regulated or unregulated area and control engine operation, e.g. enable or disable engine algorithms to protect engine systems or control emissions, based on the fuel quality and the location of the engine. In another exemplary embodiment, the regulation limit, e.g. sulfur limit, for the area where the engine is located, is determined and compared to the actual constituent level and appropriate action taken or not taken as detailed below. This system and method is especially advantageous for engine devices moving from location to location (from one emissions standard to another emissions standard). If tampering occurs so the sensor does not sense the fuel quality and the system determines that the engine is in an unregulated region, then the system does not modify engine operation, without any effect on the operator. Further, if no tampering occurs, but the engine senses a low fuel quality, i.e. high level of a fuel constituent related to emissions, for example sulfur, and also determines the engine to be in an unregulated region, then the control system and method automatically modifies engine operation to protect the engine or control performance thereby permitting or enhancing engine operation in the unregulated areas. This automatic control of engine operation increases the value of the engine device in the marketplace by allowing the engine devices to be transported to other locations and used in both unregulated regions and also whenever the actual fuel satisfies a predetermined quality level, without damage to engine systems such as EGR, while minimising costs associated with exhaust aftertreatment systems, and while improving performance of the engine.

Figure 2:
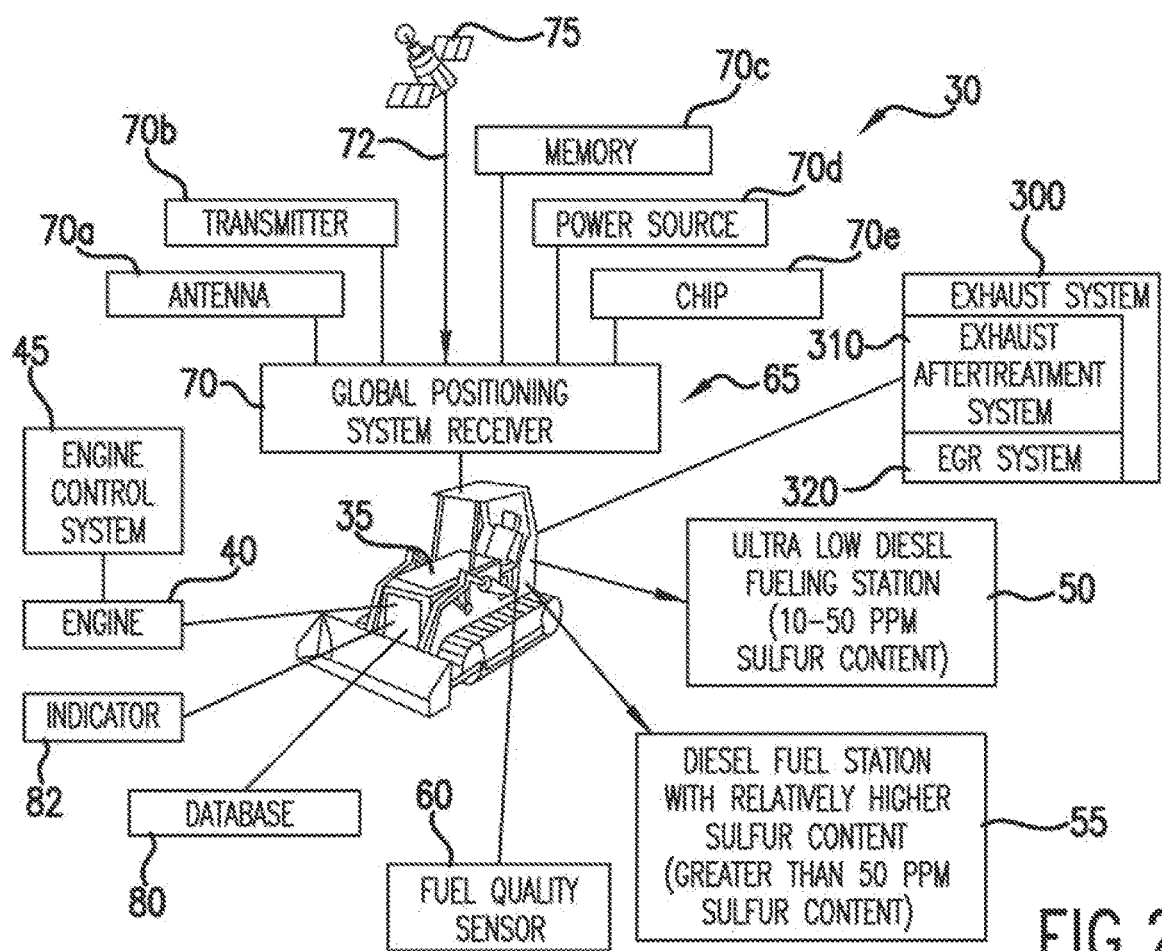
FIG. 2 shows a system view of an engine control system according to the present disclosure that uses a fuel quality sensor and a geographic location system to modify an operation of an engine.
Figure 3:
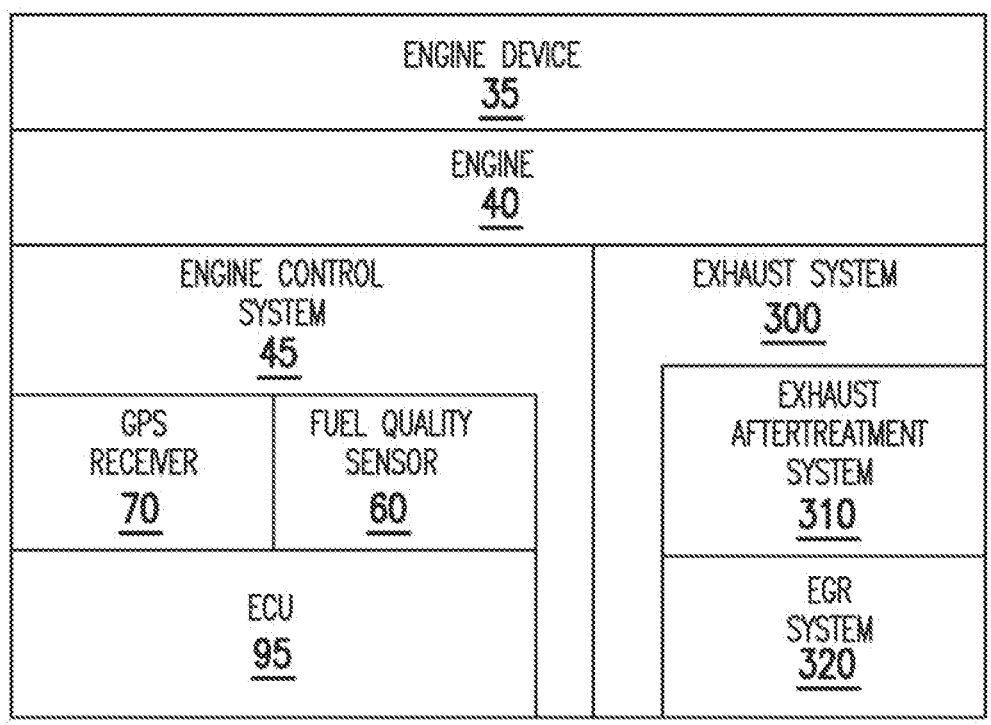
FIG. 3 shows a schematic of the various components of the engine control system as part of an engine of an engine device.

Referring to FIGS. 2 and 3, exemplary embodiments include an engine control system 45 including a fuel quality sensor 60 to detect a quality of the fuel, in the engine, related to the level of emissions produced upon combustion of the fuel and a geographic location or navigation device 65 to determine the geographic location of the engine device 35, and thus engine 40. Using the feel quality and the geographic location, the engine control system 45 can enable or disable an engine algorithm to improve performance of, and/or protect, engine 40.

Turning now to FIG. 2, there is shown a high level diagram, showing the use of the system and method, of exemplary embodiments with a bulldozer as an engine device 35. The system and method may be used, however, with any type of engine device 35 having an internal combustion engine capable of combusting fuel, including any movable machine or equipment, truck, bus, automobile, locomotive, construction and industrial equipment, portable or movable generator, and marine vessel. The engine device 35 includes an engine 40 and an engine control system 45. In an exemplary embodiment, engine 40 is a diesel engine; however, it should be appreciated that engine 40 may be any internal combustion engine. The engine 40 may be coupled to a fuel tank (not shown), for example, a typical tank mounted on engine device 35, containing fuel supplied from a fueling station or fueling truck. The present disclosure is not limited to any specific fuel and thus may be applicable to diesel fuel, gasoline, E15 fuel, E20 fuel, E85 fuel, hybrid vehicles, ethanol, biofuels, methanol or any other type or source of fuel used in connection with an internal combustion engine. For example, the fuel may be ultra low sulfur diesel fuel, having about 10 to 50 ppm sulfur content obtained from a first fueling station 50, or may contain a diesel fuel having greater than 50 ppm sulfur content, obtained from a second fueling station 55. The present disclosure also includes any combination of fuels, for example, resulting from refilling a partially empty tank with a different, fuel than already in the tank.

It should be appreciated that the fuel, and the fuel quality is illustrative of only one embodiment of the present disclosure and the fuel may vary depending on the engine 40, the availability of certain fuels in a particular geographic location, and/or emissions standards. The present disclosure is intended to cover multiple fuels having different levels of a fuel constituent related to emissions, i.e. sulfur, and the ranges shown are merely illustrative of one non-limiting embodiment of the present disclosure. For example, fueling stations 50, 55 may alternatively be illustrative of gasoline having ten or twenty percent ethanol or gasoline having E85 fuel. Various configurations are possible and within the scope of the present disclosure.

It should be appreciated that the first and the second fueling stations 50, 55 may be disposed in different geographic locations, for example, in a first country or region, such as Germany in Europe 10, that mandates ultra low sulfur diesel fuel, and a second country or region having no requirement, such as for example Brazil 25 as discussed in FIG. 1. Preferably, the engine control system 45 is operable to control operation of the the engine, for example, by engaging or disengaging engine control features, such as by activating and/or deactivating engine control algorithms, to optimize the operation of engine 40 to accommodate fuel from either the first or the second fueling stations 50, 55. The present disclosure may be implemented partly on a computer system. The engine control system 45 may include the engine's ECU 95, or may be in the form of a second control unit or module different from ECU 95.

Engine 40 also includes a fuel quality sensor 60 mounted on the engine to detect the quality of the fuel contained in engine 40. The fuel quality sensor 60 functions to determine, e.g. detect, sense, or measure, the quality of the fuel by preferably determining the level of at least one emissions related constituent in the fuel in the engine or in the exhaust from combustion of the fuel in the engine, or an emissions related parameter or characteristic of the fuel in the engine. The fuel constituent or characteristic may directly relate to fuel quality or may indirectly correlate to fuel quality so that fuel quality can be determined, for example, by calculation. In a one exemplary embodiment, fuel quality sensor 60 detects the amount of a constituent in the fuel or in the exhaust, such as sulfur, which directly relates to the emission produced upon combustion of the fuel in the engine. Thus, in one embodiment, the fuel sensor 60 may comprise a sulfur sensor adapted, to sense the amount of sulfur in the fuel present in the engine or the sulfur dioxide present in the exhaust resulting from the combustion of the fuel in the engine. In one embodiment the sulfur sensor 60 uses ultraviolet measurement of the combustion of the fuel. The measurement is conducted on a specific wavelength to determine the sulfur dioxide emitted which correlates to the sulfur in the fuel. The method for this is ASTM 54, 53 and one tool may be the sensor or analyzer machines offered by Antek Instruments, Inc. The fuel quality sensor 60 may be of the type capable of directly sensing sulfur in the liquid fuel, e.g. combusting a fuel sample from the fuel supply system to measure sulfur, or determining sulfur content of the fuel by measuring a constituent, such as sulfur dioxide, in the engine exhaust. The sensor device may connect to the fuel tank or fuel supply lines, or the engine exhaust, and automatically, continuously or periodically sample the fuel and determine sulfur content. Alternatively, the sensor device may periodically sample the fuel or exhaust, and determine sulfur content, upon initiation by a switch triggered upon filling/refilling of the fuel supply tank or some other event. Preferably, the fuel quality sensor 60 generates an output signal representative of the quality of the fuel, i.e. sulfur level, to ECU 95 as discussed herein.

The system 30 also includes a geographic location device 65, which preferably is a Global Positioning System receiver 70 that receives at least one signal 72 from a Global Positioning Satellite 75, "GPS" is a shorthand name for Global Positioning System, a system of satellites, computers, and receivers that is able to determine the latitude and longitude of a receiver 70 on land and sea by calculating the time difference for signals 72 from different satellites 75 to reach the receiver 70. GPS 70 and satellites 75 are well known in the art.

Developed and operated by the U.S. Defense Department, GPS is a radio-navigation system consisting of a 24-satellite constellation. Using precise location, and timing signals emitted by these satellites, GPS permits land, sea and airborne users to determine their three-dimensional position, velocity and time twenty four hours a day, in all weather. The instant GPS system is operable to obtain positional information anywhere in the world, providing location with a precision and accuracy far better than any other radio navigation system. Preferably, using the signals 72 received by the GPS receiver 70, the precise and accurate location of the engine device 35, in longitude and latitude, may be determined. The GPS receiver 70 preferably includes an antenna 70*a*, a wireless signal transmitter 70*b*, an identification memory 70*c*, and signal processing chipset 70*e* that are all coupled, to a power source 70*d*. The chipset 70*e* preferably includes a unique code that identifies the specific receiver 70.

Alternatively, system 30 preferably may be manufactured, using other navigation devices 65, such as, for example, EGNOS, Galileo, or Euridis satellite navigation. For example, the system 30 may alternatively infer the position of the engine device 35 using a mobile telephone network. System 30 may obtain an intensity reading and a direction, of a radiofrequency signal emitted from a mobile communication device to a mobile communication base station or tower as is known in the art. Using the intensity and direction of the signal with the known location of the mobile communication tower in a software program, the system 30 can infer the location of the engine device 35. Still in another alternative embodiment, the system 30 may include an electronic compass to determine a location of the engine device 35. Further, the engine device 35 may alternatively detect positional information as the engine device passes through a toll gate or fueling station.

Turning now to FIG. 3, there is shown engine control system 45 (which is part of engine 40) including GPS receiver 70, an engine control unit (ECU) 95, and fuel quality sensor 60. ECU 95 includes a processor and a database 80 (FIG. 2). Engine control system 45 receives a fuel quality signal from sensor 60 and a GPS signal from receiver 70 indicative of a position of the engine device 35. In real time, and accesses database 80 which includes an updatable lookup table. Control system 45 then accesses the lookup table to identify the current emissions standard for the real time location and provides a signal representative of the current emissions standard. For example, the signal may indicate the current emissions standards such as the maximum amount of sulfur permitted in the diesel fuel for that geographic location and/or simply whether the current real time region is unregulated or regulated and/or whether the region requires ultra low sulfur diesel fuel or another category of diesel fuel that includes a relatively higher sulfur content.

Fuel quality sensor 60 is mounted on the engine 40 in an appropriate location to detect the quality characteristic of the fuel in the engine, or the exhaust from combustion of the fuel. For example, fuel sensor 60 may be mounted on or in the fuel tank, in a suction or discharge line from the fuel pump, or at any other location in the fuel system, whereas an exhaust sensor may be mounted along an exhaust system 300, such as in the exhaust manifold. Sensor 60 detects the characteristic of the fuel or exhaust indicative of quality, i.e., an emissions related fuel, constituent such as sulfur, and provides a signal to the ECU 95. ECU 95 then determines whether the fuel is the correct fuel based on a geographic location of engine 40 detected by GPS 70 and the applicable emissions standard.

Figure 4:
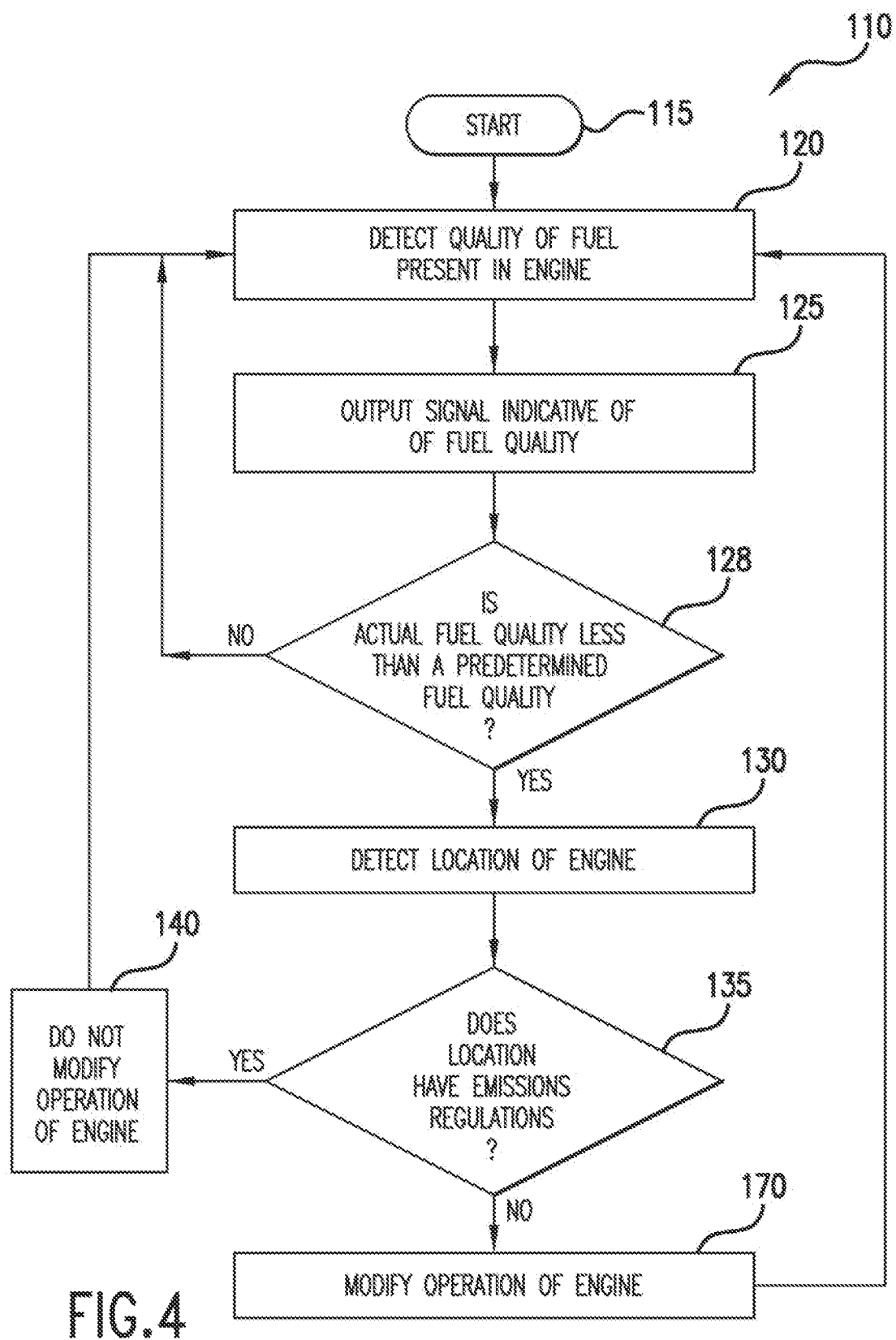
FIG. 4 shows a method of controlling operation of an engine based on fuel quality and whether the engine is located in an emissions regulated or emissions unregulated region.

Turning now to FIG. 4, there is shown a method or process 110 according to the present disclosure to modify operation of engine 40 based on emissions related fuel quality and the geographic location of engine 40. Turning now to step 115, method 110 commences and passes to step 120. At step 120, method 110 detects actual fuel quality, e.g., using sensor 60, of the fuel in the engine device and outputs a signal representing the actual fuel quality, e.g. sulfur content, to ECU 95 at step 125. At step 128, method 110 determines whether the actual fuel quality is less than, i.e. the sulfur content greater than, a predetermined fuel quality value, i.e., predetermined sulfur content value. The predetermined fuel quality value may be any value representing a desired level of fuel quality, such as a particular maximum sulfur content. For example, the predetermined sulfur content value may be the most common sulfur limit of regions throughout the world. Alternatively, if the answer to the query in step 128 is "NO", then the method returns to step 120. Thus the use of sufficiently low sulfur fuel in engine 40 does not justify action to be taken, i.e. modification or control of engine operation. If however the answer to the query in step 128 is "YES", then the method proceeds to step 130 where the geographic location of engine 40 is detected using GPS receiver 70. That is, method 110 recognizes that if engine 40 is using fuel having low quality, i.e. a sulfur content above a predetermined level, that is, at an unacceptably high level, then changes to engine operation may be desirable, depending on the engine's location.

Next, if the fuel, quality is below a predetermined standard, then at step 135, method 110 queries whether the geographic location of engine 40 has emissions regulations, i.e., whether the location is an emissions regulated region/location or an emissions unregulated region/location. If the answer is "YES" and thus the fuel quality, i.e. sulfur content, of the fuel is regulated in the region where the engine is located, then method 110 moves to step 140. For example, the latitude: 48.6908333333 and longitude: 9.14055555556 (48° 41'27" N/9° 8'26" E) is located in Europe. ECU 95, for example, accesses a look up table in the database 80 using this location information, from GPS receiver 70 and determines that engine 40 is in a sulfur regulated region. Since the region is an emissions regulated region, the method does not modify engine operation. Method 110 then passes control back to step 115 or 120. If method 110 determines that the engine location does not have emissions regulations, then control passes to step 170 where engine control system 45 modifies engine operation to achieve a particular objective such as improving engine performance and/or protecting an engine component or subsystem, such as an exhaust aftertreatment system 310. After step 170, control then returns to step 115 or 120.

An emissions regulated region typically includes fuel regulations defining the quality of fuel that most be used in the region, e.g. limits on the amount of certain fuel constituents, such as sulfur, as part of the effort to minimize emissions. In addition, some of the components needed on the engine/aftertreatment system to meet these emissions limits, need the lower sulfur content fuel for proper operation. Therefore, modifying engine operation in step 170 to, for example, improve engine performance or protect an engine subsystem, while possibly increasing emissions, is not permitted by the method/system. Of course, the conventional engine diagnostic system may operate to entice the engine operator to correct the emissions violation by, for example, using a visual indicator, such as a dashboard light, and/or derating the engine by reducing power output.

However, on the other hand, when engine 40 is located in an unregulated region, that is, without, or with less restrictive, emissions regulations, then engine operation may be modified or controlled to enhance engine performance and/or protect engine components, even though such control may increase engine emissions. It should be noted that the method/system of the exemplary embodiment may define an unregulated region as including a regulated region having a maximum emissions related constituent limit, i.e., sulfur limit, above a predetermined high level, such as a level that would not likely be exceeded even with a modification to engine operation as discussed herein.

In the exemplary embodiment, modification or control of the operation of engine 40 by engine control system 45 includes, for example, deactivating the engine's exhaust gas recirculation (EGR) system 320 and/or the exhaust aftertreatment system 310. Specifically, an EGR system does not function properly and may be damaged when exposed to emissions from the combustion of fuel containing a high amount of sulfur. Therefore, when high sulfur fuel is detected in an engine located in an unregulated region, the EGR system is disabled to protect the EGR system from damage. Also, exhaust aftertreatment systems may not be desirable in unregulated areas and may be disabled to save costs. Of course, other engine systems and controls may be modified or controlled to vary engine operation based on the quality of the fuel and the engine's location. For example, any one or more of the following may be performed; control of the flow of the engine exhaust to an air cooler, activating or deactivating certain valves, modifying the timing of the opening and closing of the intake and exhaust valves, activating or deactivating diagnostic devices, activating or deactivating warning systems to, for example, alert the operator to take some action such as remove a part and replace with another part, activating or deactivating diagnostic trouble codes, modifying operation of one or more spark plugs, modifying operation of fuel injectors, modifying operation of engine timing algorithms, or any other power rotated parameters of the engine 40. Indication of the modification of engine operation may be provided by an indicator 82 (FIG. 2) and may be any audible signal and/or a visual signal. For example, in engine device 35, a dashboard light or display may flash or light up to notify the operator.

By deactivating certain emissions diagnostics when fuel quality is low in an unregulated region, the method 110 and system 30 prevents undesirable enticing functions from being activated, such as derating the engine, thereby reducing the likelihood that users will tamper with or attempt to disable engine sensors, systems and components in an attempt to achieve desirable engine operation.

Figure 5:
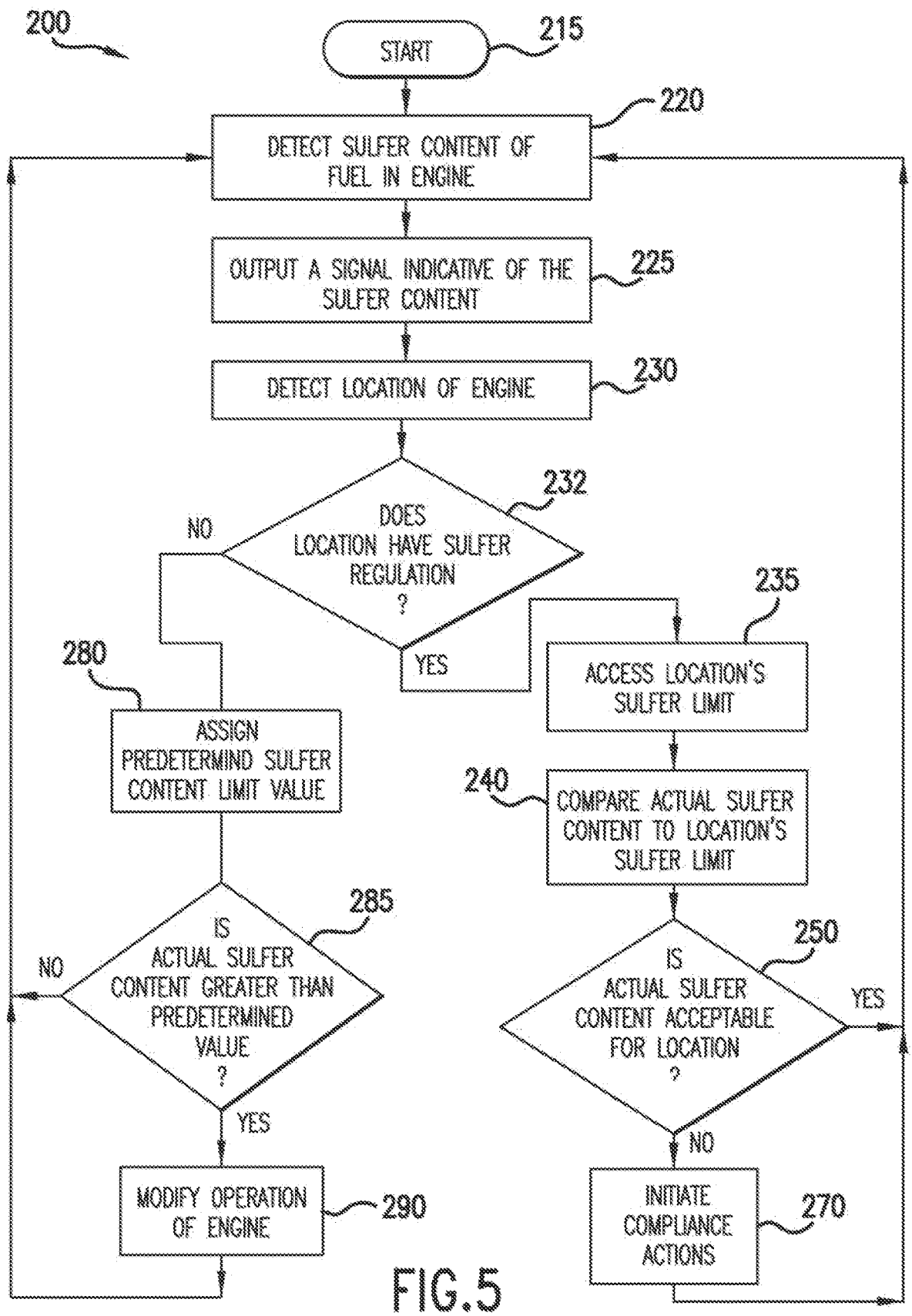
FIG. 5 shows a method of controlling the operation of an engine based on fuel sulfur level of the fuel present in the engine relative to a predetermined sulfur limits such as a regulated limit of the region in which the engine is located or a predetermined sulfur limit.
Figure 6:
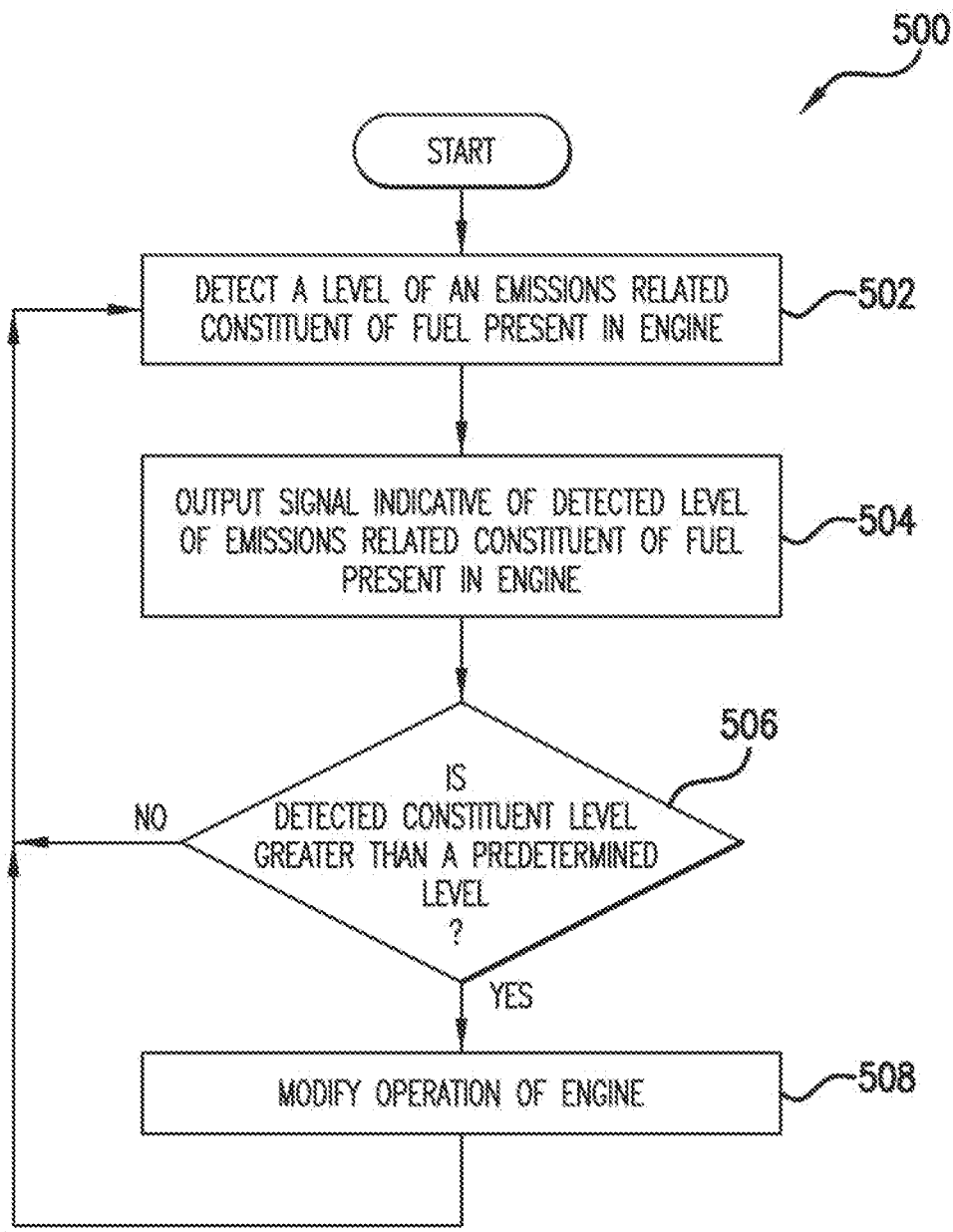
FIG. 6 shows a method of controlling operation of an engine based on an emissions related quality of the fuel present in the engine.

Turning now to FIG. 5, there is shown a method 200 of controlling an engine based on the level or amount of sulfur in the fuel present in the engine and the geographic location of the engine. Turning now to step 215, the method 200 commences and passes to step 220. At step 220, the method 200 detects the actual sulfur content in the fuel being used in the engine and outputs a signal indicative of or corresponding to the sulfur content to the processor 95 at step 225. For example, the sulfur content in the fuel can be directly detected by sensor 60. At step 230, the method 200 detects a geographic location, i.e. longitude and latitude, of the engine using the global positioning system receiver 70 of navigation system 65.

The method then proceeds to step 232 where the system determines whether the location, has a sulfur regulation. If the engine is located in an emissions regulated region, country or area, and therefore has regulated sulfur limits for fuel used in that area, the method proceeds to step 235. In step 235, the method 200 accesses the acceptable sulfur limit for diesel fuel for the region in which the engine 40 is located. As mentioned previously above, the Tier 5 emissions standards require diesel fuel having about 10 ppm sulfur content or less in Europe. In other regions, such as Brazil or China, the sulfur content of the diesel fuel can be relatively higher and ultra low sulfur diesel fuel may not be readily available. Database 80 may also be periodically updated via wireless interface 105 or network connection to have the most current emissions standards based on the geographic region.

At step 240, the actual sulfur content of the diesel fuel being used in the engine is compared with the location's acceptable sulfur limit for the emissions standard. Control passes to step 250 where a decision is reached as to whether the actual sulfur content is acceptable based on the emissions standard for the location of the engine 40. If, at step 250, the diesel fuel, being used in the engine has an acceptable sulfur content, i.e. equal to or less than the sulfur content limit for the current engine location, then control of the method 200 returns to step 220.

If at step 250, the diesel fuel being used in the engine has an actual sulfur content that is not acceptable, i.e. greater than the region's regulated sulfur limit then control of the method 200 passes to step 270 where compliance actions are taken by the engine control system to entice the operator to comply, such as providing a noncompliance indication to the engine operator via for example a light on the operator panel, limiting the engine power (derating) by, for example, controlling fuel control valve(s), etc. Control then passes back to step 220.

In step 232, if the engine location, does not have a sulfur regulated limit control then passes to step 280 where the system assigns a predetermined sulfur limit value such as the sulfur limit of the regulated region closest to the location of the engine, the highest regulated limit of surrounding regions, or any other value. The method then proceeds to step 285 where it is determined whether the actual sulfur content of the fuel used in the engine is greater than the assigned predetermined value. If the actual sulfur content value is less then, or not greater than, the assigned predetermined sulfur limit value, then control returns to step 220. However, if the actual sulfur content of the fuel being used in the engine is greater than the assigned predetermined value, then the method moves to step 290 to modify operation of the engine to protect an engine subsystem or component which may be adversely affected by the high sulfur content, or modify operation of the engine to improve performance of the engine regardless of emissions. For example, if the exhaust aftertreatment system is disabled, thermal management of its components would not be needed, which could improve fuel economy. Or, if the exhaust aftertreatment system included selective catalytic reduction (SCR) and the SCR system is disabled, diesel exhaust fluid (DEF) would no longer be needed. By conducting steps 232, 280 and 285, the method avoids engine control measures, such as deactivating an EGR or an aftertreatment system, when the location does not have sulfur regulation and the sulfur of the fuel being used is sufficiently low so as not adversely affect an EGR or aftertreatment system. In another possible aspect of the invention, even if the engine is in an unregulated area, the system and method may determine that the fuel being used has sufficiently low sulfur diesel e.g. greater than the assigned predetermined value but less than a level that may cause damage to the exhaust aftertreatment system such as 500 ppm, to permit operation of the exhaust aftertreatment system. In either case, the next logistical step is to give the operator the option to enable or disable. As an example, assuming the aftertreatment system contains an SCR system, deactivating the aftertreatment system would eliminate the need for DEF during operation, which may be desirable to some operators in those regions. In another variation, the assigned predetermined value in step 280 could be the sulfur limit for the exhaust aftertreatment system.

In yet a further embodiment of the present disclosure, the global positioning system receiver 70 of FIG. 2 may assist the user with finding a fueling station having fuel with a level of sulfur meeting the location's sulfur standards. This may be accomplished by determining the location of engine 40 and then processor 95 accessing the database and memory 80 to determine whether a specific fuel is available in a specific geographic region close by. As noted above, database 80 may be updated periodically, via a wireless interface or during service events, to have the most current information on fuel type availability and location. The controller 95 may output a signal to the indicator 82 to provide information to the operator regarding the location of the fueling station 50. For example, the database 80 may have a lookup table of the availability of a fueling station 50 that supplies or sells ultra low sulfur diesel fuel with 10-50 ppm sulfur content and may communicate the fueling station 50 location and distance information to the operator. Alternatively, the database 80 may access the lookup table and determine that a fueling station 50 that has ultra low sulfur diesel fuel with 10-50 ppm sulfur content is not available and may communicate the unavailability to the operator.

As noted above, the system and method consistent with the claimed invention may modify engine operation by disabling an exhaust aftertreatment system when the fuel being used by the engine is of a low quality, i.e. contains a higher than acceptable level of an emissions related constituent, such as sulfur, and the engine is located in an area that is unregulated. Referring to FIG. 3, the engine 40 includes an exhaust system 300 which may include an exhaust aftertreatment system 310. For example, selective catalytic reduction (SCR) is a means of converting nitrogen oxides, also referred to as $NO_x$ with the aid of a catalyst into diatomic nitrogen, N2, and water, H2O. A diesel exhaust fluid such as a gaseous reductant or dosing reagent, typically anhydrous ammonia, aqueous ammonia or urea, is added to a stream of flue or exhaust gas and is absorbed onto a catalyst. Carbon dioxide, $CO_2$ is a reaction product when urea is used as the reductant. For example, urea may be introduced to seduce pollutants; however the urea is expensive and adds to the overall expense of operating the engine 40. In other jurisdictions, selective catalytic reduction is not required and an operator of the engine 40 is under no requirement to use the selective catalytic reduction method, such as, for example, in Africa. However, if a urea is not added certain diagnostic devices may be activated even though the exact cause of the problem is not indicated. The system and method consistent urn the claimed invention avoids the costs associated with a reductant by disabling the aftertreatment system when low emissions are not required.

FIG. 5 illustrates another method 500 consistent with the claimed invention and performed by the system which includes the step 502 of detecting a quality of the fuel related to emissions by, for example, using sensor 60 to detect so emissions related constituent, such as sulfur, in the fuel actually present in the engine. The method then proceeds to step 504 wherein the sensor 60 outputs a signal indicative of the fuel quality, i.e. sulfur content. ECU 95 processes the fuel quality signal to determine whether operation of the engine should be modified based on the signal. For example, in step 506, ECU 95 may compare the detected sulfur level of the fuel in the engine to a predetermined sulfur level, and modify some aspect of engine operation (step 508) only if the detected level is greater than the predetermined fuel quality, i.e. sulfur level. Alternatively, in step 506, the query may be whether the detected fuel quality, i.e. sulfur level, is less than the predetermined fuel quality, i.e. predetermined sulfur level. ECU 95 may generate and transmit appropriate control signals to modify operation of various engine components and systems as discussed hereinabove to improve performance of the engine when operating on the fuel having the particular detected quality, or to protect the engine components or systems such as exhaust aftertreatment systems. For example, since EGR systems may be damaged by the emissions resulting from combustion of high sulfur fuel, ECU 95 may generate a control signal disabling the EGR system.

In each of the embodiments described above, multiple constituent thresholds or levels may be used to determine the whether to control engine operation and what engine components to control. For example, the levels could be viewed as creating ranges or buckets, such as less than 50 ppm, 50-500 ppm, and greater than 500, that demand different modification, if any, to engine operation. For example, the exhaust gas recirculation system and the selective catalytic reduction system with urea dosing have different tolerance levels to sulfur in fuel. For example, SCR should be more tolerant. In this case, in one possible implementation, if the sulfur level (ppm) is below x (e.g. 50 ppm), no action would be taken. If the sulfur level is between x and y (e.g. 30-500 ppm), the exhaust gas recirculation system operation is modified or deactivated. Then, if the sulfur level is greater than y (e.g. 500 ppm), operation of the exhaust gas recirculation system and the selective catalytic reduction system is modified or deactivated.

Generally, in operation, the computer system, operable with that method shown in the preceding figures is controlled by an operating system. Typical examples of operating systems are MS-DOS and various versions of systems offered by Microsoft Corporation, or Solaris and SunOS from Sun Microsystems, Inc., or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such, as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to an exemplary embodiment thereof, it will be understood by those skilled in the art that is made therein without departing from the spirit and scope of the invention as defined by the following claims.

I claim:

1. An engine control system, comprising:
   a fuel constituent sensor to determine a level of an emissions related constituent of fuel and to provide a fuel constituent level signal based on the level of the emissions related constituent; and
   an electronic control device to control operation of the engine based on said fuel constituent level signal and to determine whether an emission standard is regulated or unregulated,
   wherein a regulated emission standard comprises an emission limit in a current geographic location of the engine at or below a predetermined high emission level of the engine and an unregulated emission standard comprises no emission limit in the current geographic location or an emission limit in the current geographic location beyond the predetermined high emission level of the engine,
   wherein the electronic control device is configured to respond to a determination that the emissions standard is unregulated by either initiating a predetermined action if the fuel constituent sensor determines the level of the emissions related constituent
   or not initiating the predetermined action if the fuel constituent sensor does not determine the level of the emissions related constituent.

2. The engine control system of claim 1, wherein said emissions related constituent is sulfur and said fuel constituent sensor determines a level of the sulfur in the fuel present in the engine or in exhaust from combustion of the fuel.

3. The engine control system of claim 1, wherein the predetermined action comprises at least one of: controlling the flow of the engine exhaust to an air cooler, activating or deactivating certain valves, modifying the timing of the opening and closing of intake and exhaust valves, activating or deactivating warning systems, activating or deactivating diagnostic trouble codes, modifying operation of one or more spark plugs, modifying operation of fuel injectors, modifying operation of engine timing algorithms, and modifying other power-related parameters of the engine.

4. The engine control system of claim 1, further comprising a geographic location device configured to determine the current geographic location of the engine and generate a location signal; and wherein the electronic control device is in communication with said fuel constituent sensor and said geographic location device to receive the fuel constituent level signal and the geographic location signal.

5. The engine control system of claim 1, wherein the fuel constituent sensor senses a level of sulfur in the fuel present in the engine, said fuel constituent level signal being indicative of the level of sulfur in the fuel.

6. A method for controlling an engine, the method comprising:
   determining whether a level of an emissions related constituent of fuel has been sensed;
   determining whether an emission standard is regulated or unregulated, wherein a regulated emission standard comprises an emission limit in a current geographic location of the engine at or below a predetermined high emission level of the engine and an unregulated emission standard comprises no emission limit in the current geographic location or an emission limit in the current geographic location beyond the predetermined high emission level of the engine;
   initiating a predetermined action if the emission standard is unregulated and the level of the emissions related constituent of fuel has been sensed; and
   not initiating the predetermined action if the emission standard is unregulated and the level of the emissions related constituent has not been sensed.

7. The method of claim 6, wherein said emissions related constituent is sulfur and sensing the level of the emissions related constituent includes detecting a level of sulfur in the fuel present in the engine.

8. The method of claim 6, wherein the predetermined action comprises at least one of: controlling the flow of the engine exhaust to an air cooler, activating or deactivating certain valves, modifying the timing of the opening and closing of intake and exhaust valves, activating or deactivating warning systems, activating or deactivating diagnostic trouble codes, modifying operation of one or more spark plugs, modifying operation of fuel injectors, modifying operation of engine timing algorithms, and modifying other power-related parameters of the engine.

9. The method of claim 6, further comprising determining the current geographic location of the engine, generating a location signal based on the current geographic location of the engine, and receiving, by the electronic control device, the location signal.

10. The method of claim 6, wherein the predetermined action comprises providing an indication to an operator indicating that the level of the emissions related constituent exceeds the emissions limit.

11. The method of claim 6, wherein the predetermined action comprises reducing engine power.

12. The method of claim 6, further comprising accessing a lookup table with fueling station information stored in a database and, based on the current geographic location, determining a location of a nearby fueling station having fuel with an emissions related constituent level not exceeding the emissions limit.

13. The engine control system of claim 1, wherein the predetermined action comprises providing an indication to an operator indicating that the level of the emissions related constituent exceeds the emissions limit.

14. The engine control system of claim 1, wherein the predetermined action comprises reducing engine power.

15. The engine control system of claim 1, wherein the electronic control device is configured to access a lookup table with fueling station information stored in a database and, based on the current geographic location, determine a location of a nearby fueling station having fuel with an emissions related constituent level not exceeding the emissions limit.

* * * * *